INVENTORS
Norman L. Carr
Rodney E. Peterson

INVENTORS
Norman L. Carr
Rodney E. Peterson

United States Patent Office 3,646,106
Patented Feb. 29, 1972

3,646,106
CONTROL OF TRACE IMPURITIES IN PETROCHEMICAL PROCESSES
Norman L. Carr, Allison Park, and Rodney E. Peterson, Oakmont, Pa., assignors to Gulf Research & Development Company, Pittsburgh, Pa.
Filed June 12, 1970, Ser. No. 45,717
Int. Cl. C07c 5/10
U.S. Cl. 260—667                    11 Claims

ABSTRACT OF THE DISCLOSURE

A petrochemical plant comprising reactor means including a catalyst capable of inducing a catalytic exothermic reaction therein, means for controlling the inlet and outlet temperatures of said reactor means, means for supplying reactants including a normally liquid reactant to said reactor means, and control means for maintaining the temperature of said reactants above the dew point thereof in any part of said reactor means but below a temperature corresponding to a predetermined side reaction rate.

---

The present invention relates to the preparation of cyclohexane of extremely high purity and more particularly to the preparation of cyclohexane having trace impurities of 0.1 percent or less, or preferably 0.05 percent or less. Our invention is directed to the preparation of cyclohexane having an extremely low n-paraffin content, for example about 100 p.p.m. or less, and preferably to an ultra-pure cyclohexane in which the total trace paraffin impurities aggregate less than 100 p.p.m.

The preparation of cyclohexane in a very high purity range of about 99.8 to 99.95 percent has been described and claimed in a copending, coassigned application of Norman L. Carr entitled Reactivity Control in Petrochemical Processes, filed Dec. 15, 1969, S.N. 885,066. The principal impurities of the aforementioned cyclohexane plant are unconverted benzene of about 100 p.p.m. or less, normal and iso-paraffins of between about 500 p.p.m. and 1000 p.p.m., respectively and miscellaneous impurities of about 100 p.p.m. The miscellaneous impurities are mainly methyl cyclohexane which is unavoidably introduced from the toluene impurity in the benzene feed. The normal and iso-paraffin impurities comprise in the main n-hexane and iso-hexanes, respectively.

The major proportion of the aforementioned paraffin impurity is n-hexane, and our present invention is directed to the substantial elimination of n-hexane from the aforementioned group of impurities. By this drastic reduction in n-hexane, we are enabled to produce a cyclohexane of ultra-high purity of about 99.98 percent. In certain applications, for example the production of nylon, it is extremely important to minimize the trace impurities of paraffins, and our present invention is further directed to the elimination of a major proportion of the paraffin impurity, present, in this embodiment of the invention, in the form of n-hexane.

Although the bare removal of n-paraffins from mixtures of n-paraffins and iso-paraffins is known, the application of the removal operations to trace impurities and in combination with the cyclohexane operation claimed in the aforementioned copending application is productive of surprising and inobvious results. This is particularly the case, where it has not been previously demonstrated that the principal paraffin impurity of the cyclohexane product is n-hexane. The present invention also contemplates a novel and surprising modification of the prior cyclohexane operation, to minimize the production of both n-hexane and iso-hexane impurities in the first instance.

As demonstrated in the aforementioned application, operation of the cyclohexane plant as close as practical to maximum catalyst temperatures is necessary in order to achieve acceptable production rates. However, increases in operating temperatures also increase the level of paraffin impurities. For example, an increase in operating temperature from 350° F. to 450° F., as evident from FIG. 1 (described below), increases the production of paraffin impurities by about ten-fold. On the other hand, a reduction in operating temperature from about 450° F. to about 350° F. causes an undesirable reduction of about 50 percent in plant output. Therefore, temperature reduction by itself does not constitute a practical solution to the impurity problem owing to its considerable and adverse effect upon yield.

In accordance with the present invention it has been discovered that when the catalyst for the petrochemical process described below and in the aforementioned copending application is nickel on kieselguhr, the paraffin impurity is primarily n-hexane rather than iso-hexane. For example, in the operating temperature range of about 450° F. to 500° F. as shown graphically in FIG. 2, (described below), the n-hexane content in the product increases exponentially with temperature. In the temperature range dealt with in FIGS. 1 and 2, we have discovered that the distribution of n-paraffins in the total paraffin impurity is not temperature dependent, but the total production of paraffins is temperature-dependent. The production rate of side reactions tends to become intolerably excessive, as evident from FIG. 14 (described below), at operating temperatures above 470° F., when maintained for any appreciable reaction time interval.

As pointed out above, the most unwanted impurity of the several trace materials in the cyclohexane product is n-$C_6$, at least in certain applications. The present invention is directed therefore to limiting the n-hexane impurity in an unexpected manner. The reduction of the n-paraffin impurity to a surprising extent is one of the unexpected results of our invention. Use of those parameters for reduction of the n-paraffin impurity also reduces other trace impurities.

It is known that 4A or 5A Molecular Seieves or equivalent zeolite materials can selectively absorb n-$C_6$ and n-$C_7$ from non-normal paraffin mixtures. Molecular Sieves are available from Union Carbide Corporation (Linde Division), South Charleston, W. Va. In contrast, as pointed out above, it is not presently known to the art that normal hexane (see Table III, below) constitutes the preponderant impurity of the aforementioned petrochemical process, particularly at the optimum operating temperature range, i.e. in avoidance of dew point conditions and with optimum yield without undue debilitation of the catalyst. Other trace impurities, such as iso-hexane, pentane, butane, methyl cyclopentane and methyl cyclohexane are controlled to tolerable levels by the unusual operating procedure of our present invention. The use of molecular sieves, in the manner described herein, to upgrade cyclohexane or similar petrochemical product is an important feature of our invention and has not been anticipated or suggested in the prior art, insofar as we are aware.

Even if it were not known that normal $C_6$ is the principal impurity of the aforementioned petrochemical process, it could not be considered obvious to utilize molecular sieves for a substantial reduction in the trace of impurities. In more conventional plant operations, the non-removable iso-$C_6$ impurity constitutes of itself more than the minimum specification for total paraffins in the product in certain applications. In the case of cyclohexane, a minimum specification of 100 p.p.m. is established for certain uses, such as in the production of nylon. Accordingly, if the iso-paraffin impurities exceed the minimum impurity specification, it would not be obvious to treat the product with molecular seives, as the iso-paraffins are not removed by molecular sieves. Therefore, treatment of the conventional product with molecular sieves would not achieve desired product specifications.

It is an unexpected feature of the present invention that the total paraffin impurity of a cyclohexane product or the like can be reduced below the aforementioned impurity limit through the use of molecular sieves. This can be actualized, in accord with our present invention, by modifying process conditions (see FIGS. 2 and 14) to depress the iso-paraffin and other impurities which are non-removable with molecular sieves, to a point well below the impurity specification. With subsequent treatment by molecular sieves, the normal-paraffins can be substantially removed, such that any residual n-paraffins do not increase the total paraffinic impurity above the product total impurity specifications.

As pointed out above, with reference to FIG. 2, the total paraffin impurity including its n-hexane complement increases exponentially with temperature in the temperature range above 450° F. and becomes intolerably large for many applications. Therefore, the maximum temperature in the first and third reactors of the three-reactor system illustrated in FIG. 3 (described below) must not be more than about 450° F. to 470° F. Since the second reactor of the aforementioned three-reactor system is an abbreviated chamber, the outlet temperature of the second reactor will not be a problem as long as the outlet temperatures of the first and last reactors are less than 460±10° F.

We have also discovered that the quantity of cracked product impurities, i.e n-$C_6$, iso-$C_6$, $C_5$, $C_4$ is dependent upon the sum of the space-times (pounds of catalyst times hours/pounds of fluid) in the first and third reactors of the system. In a specific, multiple reactor system of FIG. 3 (described below), we have found that cracked product impurities varies directly with the sum of the space-time parameters. Owing to the abbreviated bed length of the second or intermediate reactor of the aforementioned reactor system, the space-time parameter of the abbreviated reactor is negligible. Also pertinent is the fact that most of the length of each catalyst bed in the first and third reactors operates at or close to the maximum reactor temperature. This is not the case in the abbreviated second reactor, which has a comparatively steep temperature gradient along the entire length of its catalyst bed.

In accordane with the present invention, we have found that the production of cracked paraffin impurities is further and unexpectedly minimized when the summation of the space-times in the first and third reactors is maintained below about 0.4 and preferably at 0.2 or less.

A most surprisingly aspect of our invention, is our discovery that while the total quantity of cracked impurities is dependent upon both temperature and space-time, the distribution of individual materials in the impurity complement is not so dependent. Thus, the non-removable complement of the total cracked paraffins in the petrochemical product can be significantly reduced and at substantially the same rate as is the total quantity of paraffins, by proper control of operating temperatures and space-time parameters. Preferably, such control is exercised such that the non-removable iso-paraffin complement initially is less than the aforementioned minimum specification, for example 100 p.p.m. or less.

With our discovery that a major portion of the paraffin impurity is n-hexane, the total paraffin impurity initially and surprisingly can be several times the minimum specification. Quite unexpectedly, then, treatment of the petrochemical product with molecular sieves, permits attainment of the aforementioned, very low impurtiy specification. In other terms, use of molecular sieves in conjunction with temperature and/or space-time control results in a surprisingly drastic reduction in the paraffinic complement of the final petrochemical product. Another facet to this multifactorial solution is our discovery that use of a nickel-on-kieselguhr catalyst apparently causes the removable n-paraffin impurity complement to predominate.

We accomplish these desirable ends by providing a petrochemical plant comprising reactor means including a catalyst capable of inducing a catalytic exothermic reaction therein, means for controlling the inlet and outlet temperatures of said reactor means, means for supplying reactants including a normally liquid reactant to said reactor means, and control means for maintaining the temperature of said reactants above the dew point thereof in any part of said reactor means but below a temperature corresponding to a predetermined side reaction rate.

We also desirably provide a similar petrochemical plant including a bed of zeolite material coupled to the output of said reactor means for percolation of at least a portion of reaction products therethrough.

We also desirably provide a cyclohexane plant comprising reactor means having three reactors each having a bed of catalyst material therein, the sizes of said catalyst beds being proportioned respectively to differing reactivity rates in said reactors respectively, means for controlling the inlet and outlet temperatures of said reactor means, means for supplying benzene and hydrogen reactants generally in tandem to said reactors, and control means for maintaining the maximum temperature of said reactants in the first and third reactors below 460±10° F.

We also desirably provide a similar cyclohexane plant wherein said catalyst is nickel on kieselguhr.

We also desirably provide a similar cyclohexane plant wherein said maintaining means are capable of maintaining the summation of space-time parameters at 0.2 or less.

We also desirably provide a method for operating a cyclohexane plant having a plurality of conversion reactors and a catalyst bed in each of said reactors, said method comprising the steps of supplying benzene and hydrogen reactants generally in tandem to said reactors, controlling the inlet and outlet temperatures of a first and last of said reactors to determine the temperature of each reactor at any point within its bed, and maintaining the maximum temperature of said first and last reactors below 460±10° F. to minimize side reactions.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein.

In known cyclohexane processes, a multiple reactor system has been employed in which the reactors are essentially identical to one another. The operating conditions in each of the reactors has been maintained as nearly identical as feasible. For example, the operating temperature and the benzene and hydrogen feed rates are similar in each reactor, and the recycle cyclohexane is evenly divided among the several reactors. The basic approach to operating this prior arrangement has been the essential completion of the benzene conversion within each reactor. As noted elsewhere herein, this type of prior reactor system results in a product of lowered purity, in addition to inadequate dew point margin for proper control.

Our novel petrochemical plant differs from the prior art in a number of respects, although a multiple reactor system similar to that of the aforementioned application can be employed. In such case, the size distributions of the reactors utilized in our process are differentiated for the reasons detailed below and discussed generally heretofore. Our new design can yield a higher-purity product and better control above dew point. The unreacted benzene and the hexane impurity complements are decreased because of the maintenance of low space-time parameters at maximum operating temperatures in the range of $460 \pm 10°$ F. We also employ a different approach to reactor operation in which heat and material balance are inter-related and coupled for an enhanced control capability. Further, the extent of conversion in each reactor differs not only from previous systems but differs also from reactor to reactor in our novel system. In our advantageous three-reactor system, the middle reactor is the smallest to provide the advantage of high purity (lower impurity n-$C_6$) while also minimizing the amount of unreacted benzene in the final cyclohexane product.

Figure 3:
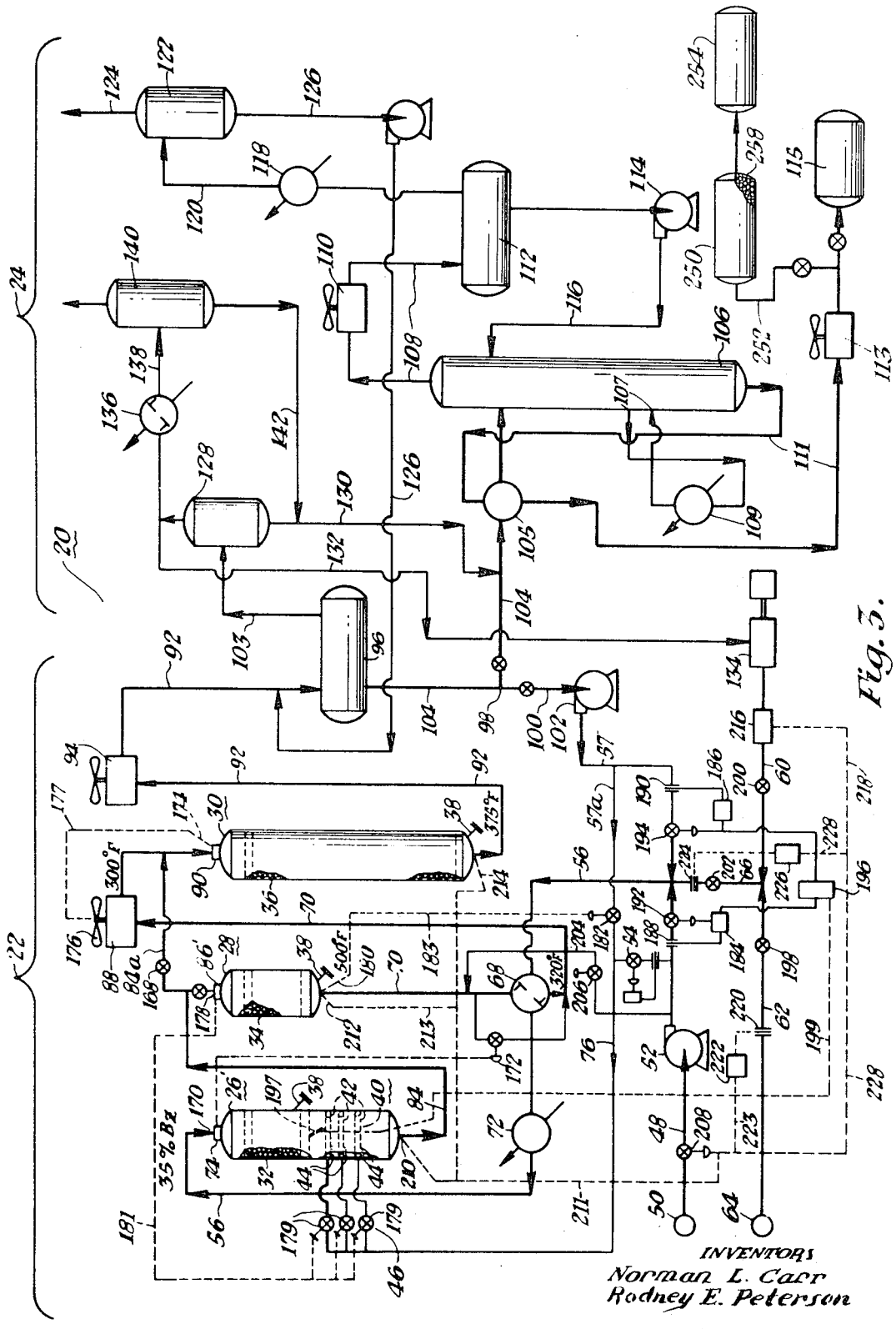
FIG. 3 is a block flow diagram of one form of petrochemical process arranged in accordance with our invention for the production of cyclohexane of ultra-high purity.

The novel system of FIG. 3 is advantageous owing to the exothermic nature of the reaction, in this example, the hydrogenation of benzene to produce cyclohexane. It is, therefore, necessary to maintain a very close control over operating temperatures at the inlets and outlets of each reactor and also to maintain particular temperature profiles through the catalyst beds of the reactors by an interdependent control of both heat and material balances. An important factor in maintaining such controls is the avoidance of any dew point temperature to obviate any potential existence of a localized two-phase condition anywhere within the reactor system. Even momentary existence of dew point conditions can introduce slugs of liquid reactants into the catalyst bed which then vaporize to produce an overly concentrated area of reactants in a subsequent, higher temperature area of the catalyst bed. These areas produce localized hot spots and potential temperature runaways of catastrophic proportions. In point of fact, relatively slight changes in temperature and comparatively small composition changes could result in reactor damage catalyst fracturing and explosion.

Control of temperature is also essential to minimize benzene side reactions, the most significant product of which is n-hexane. When properly controlled, in accord with our invention, the process yields initially only trace amounts in the order of 300 p.p.m., substantially all of which can be removed as noted below. This side reaction increases exponentially with increases in temperature at the rate of about 1.65 fold for each 10° F. increase in temperature. A major feature of the disclosed single phase operation in combination with the aforementioned control of maximum temperatures and space-time parameters is a restricted operating temperature span resulting from a minimum operating temperature determined by relatively high dew point temperature on the one hand and a maximum temperature determined by relatively low catalyst deactivation and side reaction temperatures on the other. In consequence, at least a portion of the reactor section must be operated within a few degrees (about 10–20° F.) of the dew point temperature. One arrangement for minimizing operating temperatures is to dilute the benzene feed with cyclohexane to act as a heat sink; otherwise temperature rises of about 1000° F. would be encountered. The amount of side reactions becomes significant at temperatures above 470° F. Accordingly, in most cases, it is desirable to limit the inlet temperatures of the several reactors to points above about 290° F. to preclude the existence of two phase systems in these areas. The maximum or outlet temperature of each reactor must be below 550° F. at which point the catalyst irreversibly deactivates and, in the first and third reactors (where space-time values are significant) desirable below $460 \pm 10°$ F. to reduce side reactions to a tolerable minimum. As evident from FIG. 14, side or cracking reactions tend to increase asymptotically above 470° F.

If the dew point is reached anywhere within the reactor system, the operation can deteriorate within minutes. Reactor disturbances can move through the system within a matter of seconds. If the dew point condition occurs within the system, it is necessary to cut-off the reactant feed streams. In some cases, the reactant flows simply can be reduced, or alternatively, heat can be added to the system through the feed stream pre-heaters.

In general, the control scheme is complicated by the fact that the occurrence of dew point temperatures in the reactor section engenders a two phase system causing a temperature runaway and related, often catastrophic events. The operation is further complicated by the enforced operation of the reactor system within a very few degrees of the dew point, for the reasons mentioned above. The process is a dynamic system, with the result that dew point temperatures change rather drastically with changing reactor conditions. It is difficult, if not impossible, without computer technology, to determine the dew point of a particular reactor or reactor area from considerations of outlet and inlet temperatures, pressure variations, concentration of reactants, ratio of feed to diluent or recycle cyclohexane, liquid/gas ratios, etc. Accordingly, we utilize a dew point computer, i.e. a special purpose computer, to monitor dew point conditions on a continuous basis in conjunction with automatic devices for modifying or terminating the benzene feed, if it is desired to control the reaction solely by a comparison of calculated dew point data with observed temperatures, such as reactor inlet and outlet temperatures. In many places within the reactor system, the reaction must proceed within a very few degrees of the dew point. Operating personnel are not able to determine (without the use of a computer) the specific area in the reactor system in which the dew point is being approached too closely. A computerized system for this purpose is set forth below with adaptive modifications for alternative incorporation into the control scheme of our novel system.

Referring now more particularly to FIG. 3 of the drawings, the principles of our invention are illustrated in connection with an exemplary cyclohexane plant 20. The plant 20 includes a reactor section 22 and a stabilizer section 24. Comprising the reactor section 22 are a number of individually sized reactors 26, 28 and 30, each of which contains a catalyst bed 32, 34 or 36. In the illustrated arrangement the catalyst beds are unequal in size, for example in the ratio of about 6:3:10 respectively. The catalyst in this case is a nickel-on-kieselguhr of known composition and furnished in a form of small pellets. The catalyst can be loaded from the tops of the respective vessels 26–30 and dumped through catalyst drop out 38 of each reactor vessel adjacent the lower extremity of its catalyst bed.

In this arrangement, the initial reactor vessel 26 is elongated to a greater extent than its included catalyst bed 32 would otherwise dictate in order to include a quench section 40. The quench section 40 can include a plurality of ring headers 42, with three such headers being employed in this example although a different number can be utilized. Each of the ring headers 42 includes a number of spray nozzles denoted generally at 44. A valved and branched conduit system 46 variably supplies the quench headers 42, as dictated by operating conditions of the plant 20, in the manner described below.

Fresh benzene is charged through feed conduit 48 and pump 52 from tankage or other suitable source of benzene denoted generally at 50. Suitable valving 54 and 192 can proportion the pump output such that in the illustrated cyclohexane plant, about ⅓ of the benzene feed is diverted through conduit 56. That portion of the feed benzene in conduit 56 is mixed with recycle cyclohexane and recycle gas streams (conduits 57, 60 respectively) the latter of which has been admixed previously with a make-up hydrogen stream (conduit 62) from a suitable source of fresh hydrogen denoted diagrammatically at 64. The combined recycle gas and make-up hydrogen stream is added to the benzene feed portion in conduit 56 and then heated to reaction temperature (about 275° F.) in regenerative heat exchanger 68 by heat exchange with the hot effluent (conduit 70) from the second reactor 28. The heated feed stream then passes through steam start up heater 72, which is used only during the initial phase of the start up procedure, and is discharged into the first reactor 26 through its inlet port 74.

Figure 10:
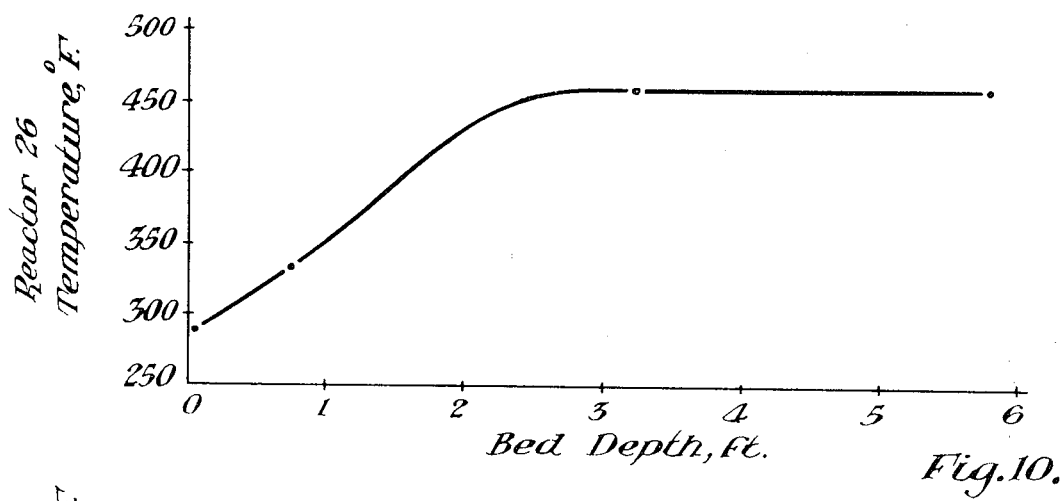
FIGS. 10–12 are graphically representations of reactor temperature profiles based on distance along catalyst beds in a multiple reactor system.
Figure 11:
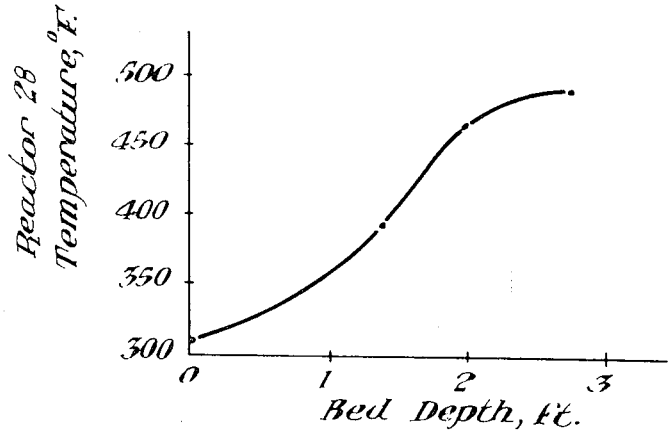

Within the first reactor 26 essentially all of the benzene is catalytically hydrogenated to cyclohexane in a highly exothermic reaction. The hot vapors flowing from the bottom of the catalyst bed 32 are quenched to about 300° F. in the lower or quench portion 40 of the first reactor vessel. As evident from FIG. 10 the temperature of the reaction products entering the quench 40 is in the neighborhood of 460° F.

The liquid quench material comprising cold fresh feed for the second reactor 28 supplied from feed pump 52 through conduit 76 and the aforementioned branched conduit 57 to which recycle cyclohexane has been added through conduit portion 57a. The quench system 42–46 is arranged to quench the effluent vapor from the first reactor bed 42 to about 300° F. The spray nozzles 44 are arranged as discussed previously to ensure complete vaporization of the quench liquid flowing therethrough.

The effluent vapors flowing through first reactor outlet conduit 84 now consists of the vaporized, added benzene feed (about ⅔ of the total benzene feed), liquid recycle cyclohexane added as part of the quench liquid (conduits 57a, 76), cyclohexane product of the first reactor 26, an unused portion of the hydrogen supplied to the first reactor portion 26 (about ⅔ of the total hydrogen feed including recycle and make-up hydrogen), and gaseous recycle cyclohexane. The feed stream thus constituted is added through conduit 84 to inlet port 86 of the second reactor 28. The second reactor employs a corresponding smaller catalyst bed 34 as the reaction therein is terminated prior to complete hydrogenation of the benzene. Within the reactor 28, then, about 70 percent of the benzene feed is converted to cyclohexane and the hot effluent vapors are discharged from the second reactor 28 at a maximum temperature of about 500° F. to the regenerative heat exchanger 68 described previously. From the heat exchanger 68 the partially cooled product and feed vapors from the second reactor 28 continue along conduit 70 to an air cooled intermediate cooler 88 where the feed stream for the third reactor 30 is cooled to about 300° F. before entering inlet port 90 of the third reactor. In the reactor 30 all of the remaining benzene is converted to cyclohexane of high purity in the considerably longer catalyst bed 36. The hot effluent vapors exit from the catalyst bed 36 at a maximum temperature of about 450° F., in this example, and are conveyed through conduit 92 to condenser 94 where they are cooled to about 120° F. or less and then discharged into a high pressure flash drum 96.

By thus controlling the heat and material balances of the first reactors 26 and 28, the composition of the feed stream fed to the third reactor 30 will vary very little. That is to say the occurrence of dynamic problems in the first or second reactor will be noticeable in the succeeding reactor or reactors. Thus, if the dynamic conditions of the first and second reactors are thoroughly controlled as outlined above, control of the third reactor 30 is relatively easy. In this connection it is necessary only to provide means for adjusting the temperature of the feed stream to the third reactor 30 owing to the potentiality of the variable by-pass around the regenerative heat exchanger 68.

Within the flash drum 96 the uncondensed gases are separated and exit from the drum by conduit 103 and compressed and recycled to the first and second reactors, 26, 28 as described below. The liquefied cyclohexane is conveyed through conduit 104 to the stabilizer section 24 of the cyclohexane plant 20. A portion of the cyclohexane liquid is recycled through conduit 100, pump 102 and the aforementioned branched conduit section 57, 57a to the first and second reactors, respectively, as described above.

The product cyclohexane liquid in conduit 104 and the gases unavoidably dissolved therein are pressurized from the high pressure flash drum 96 into regenerative heat exchanger 105 described below and thence into stabilizer tower 106. The tower 106 is designed in a conventional manner to separate the light components or dissolved gases from the cyclohexane product which exit from the tower 106 through conduit 108. To prevent unnecessary loss of cyclohexane the vent gas from the stabilizer tower 106 is cooled to about 45° F. in cooler 110 before entering condenser 112. Any cyclohexane condensate is returned to the tower 106 through pump 114 and conduit 116. The effluent gases from the condenser 112 are further cooled in cooler 118 and supplied through conduit 120 to a second condenser 122, the effluent gas of which is vented at 124. The condensate from the second condenser 122 is pumped through conduit 126 to the inlet of the flash drum 96 for further separation.

The cyclohexane liquid within the stabilizer tower 106 can be tapped at 107 for additional heating, as required, through bypass steam heater 109. The product cyclohexane is drawn off the bottom of the tower 106 through conduit 111 which passes through the aforementioned heat exchanger 105 to heat regeneratively the incoming cyclohexane stream in conduit 104 for the tower 106. From the heat exchanger 105, the product cyclohexane is conducted to cooler 113 and thence to tankage 115 or other suitable storage.

The uncondensed gases from the flash drum 96 including mainly cyclohexane vapor and unused hydrogen are supplied through conduit 103 to condenser 128. The condensed portion of the cyclohexane vapor is forwarded to the stabilizer plant section 24 through bottom conduit 130. A major proportion of the gaseous effluent of the condenser 128 is supplied through conduit 132 and compressor unit 134 to the recycle and make-up system 60–66 and thence to the first reactor feed stream through conduit 56. The unneeded portion of the effluent gases from condenser 128 are cooled in cooler 136 and supplied through conduit 138 to a second condenser 140. Substantially all of the contained cyclohexane is condensed in the condenser 140 and supplied from the bottom conduit 142 to the stabilizer section 24 through conduits 104, 130.

Figure 5:
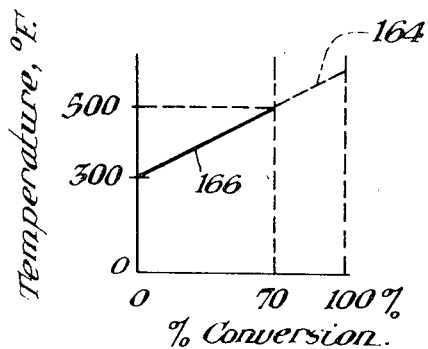
FIG. 5 is a graph showing variations in temperature within another of the reactors.

The wide variation in dew points and the difficulty of ascertaining a specific dew point at a particular location within the reactor section 22 is evident from FIG. 5. Dew point curves 144 denote the increase in dew point temperatures with increasing pressure as would be expected. Also shown is a non-linear increase in dew point temperatures with percentage of cyclohexane and benzene in the total fluid feed. At the same time dew point temperatures decrease non-linearly and inversely with increasing gas/liquid mol ratios of the several feed streams to the reactor. As evident from the foregoing, both the mol percentage of the cyclohexane and benzene in the total fluid content in the reactors varies from reactor to reactor, which is also the case in the total gas/liquid ratio. The operating pressures of one or more of the reactors may be different as indicated below.

Previously the necessity of avoiding dew point temperatures in conjunction with the precise maximum temperatures for avoiding substantial side reactions within the reactor system has been unknown. Likewise the particular means and method for controlling the various material balances, material flows, and reactor temperatures to avoid dew point temperatures and to minimize space-time values has been unknown.

Figure 6:
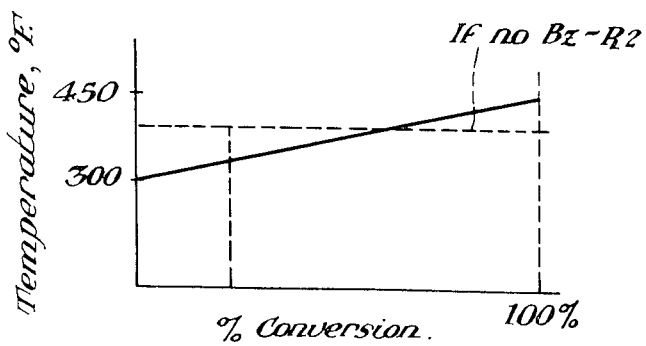
FIG. 6 is a graph showing temperature variations in a third reactor of the reactor system.
Figure 7:
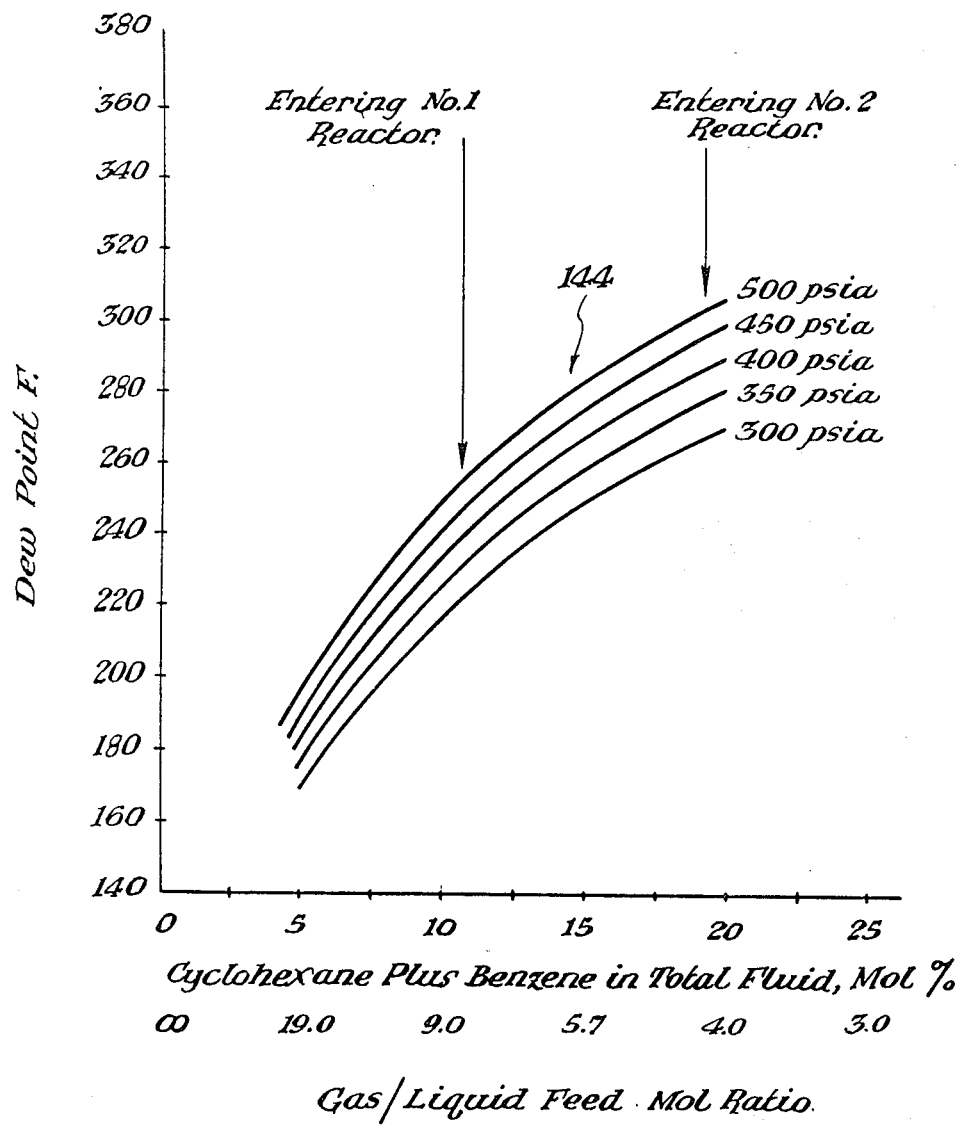
FIG. 7 is a graphical representation of a variation in the dew point temperatures in the reactor system as influenced by changes in system pressure, based on changing total amounts of cyclohexane and benzene in the total fluid, and upon changing gas/liquid feed mol-ratio.
Figure 8:
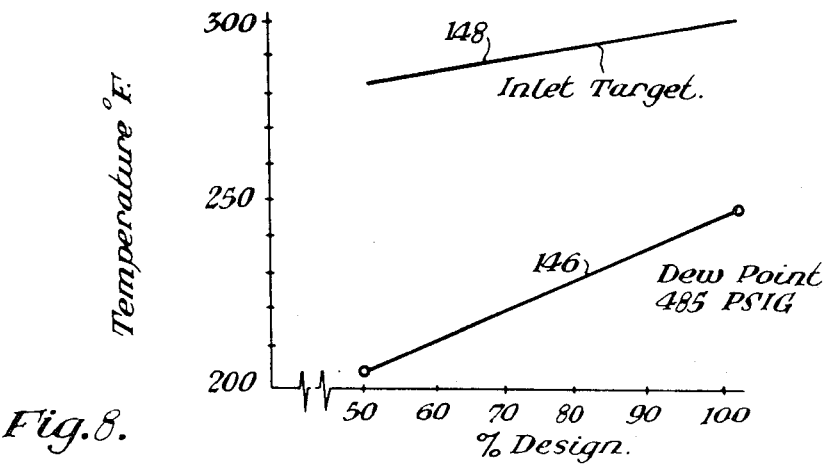
FIGS. 8 and 9 are graphical representations showing the relationship between reactor inlet temperatures and dew point temperatures as a function of percentage of design feed rate, in a multiple reactor system.
Figure 9:
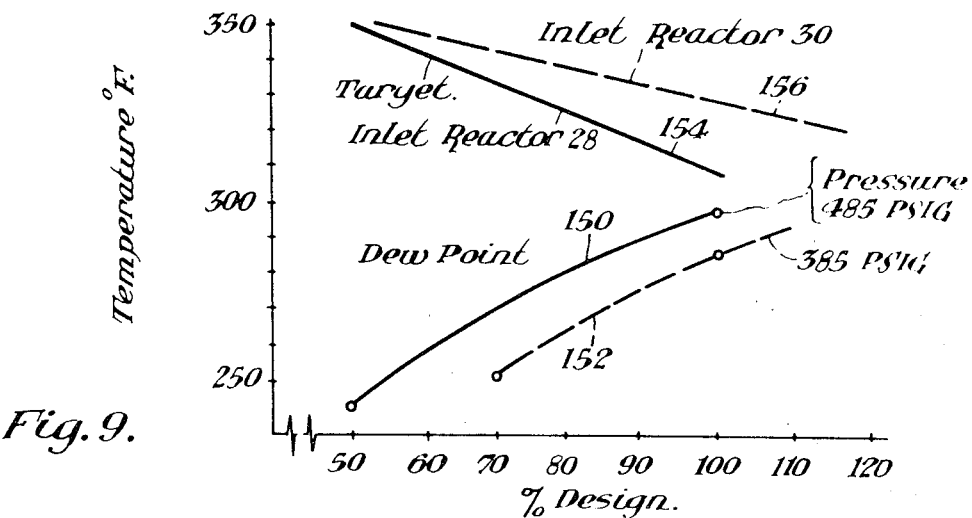

In FIGS. 8 and 9 the effect of varying feed rates from 50% capacity to a given design capacity for the illustrated cyclohexane plant is illustrated. Curve 146 of FIG. 6 represents the variation in dew point at operating pressure as the reactants are varied from 50% to full design capacity in the first reactor 26. The variation in dew point is linear as the reactants are varied not only as to quantity but also in proportion to another. The permissible variation in temperature of the entering reactants is limited but in the same general direction as the dew point progression. In general the inlet temperature must be maintained sufficiently above the dew point to prevent the occurrence of dew point conditions at any location within the catalyst bed 32 of the first reactor 26 and also to prevent unduly high temperatures which would irreversibly deactivate the catalyst.

A different situation attains in the second and third reactors 28, 30 as evident from FIG. 9. Thus, as these reactors are varied from 50% to full capacity their dew points follow curves 150, 152 respectively. However, their inlet temperatures (curves 154, 156 respectively) must be progressively reduced to avoid overheating of the catalyst. From curves 150, 154 relating to the second reactor 28 it will be seen that dew point considerations become highly critical, as the inlet temperature (curve 154) is only a few degrees above the corresponding dew point temperature (curve 150) at full capacity. The curves 150, 154 cannot intersect as the corresponding feed conditions would then produce hot spots, temperature runaways and attendant destruction of the catalyst or of the reactor itself. On the other hand the temperature curve 154 cannot be higher as the resulting reaction temperature would then be uniformly and sufficiently high to commence the irreversible deactivation of the catalyst. The situation in the third reactor 30 is similar but less critical as evident from curves 152, 156.

Figure 12:
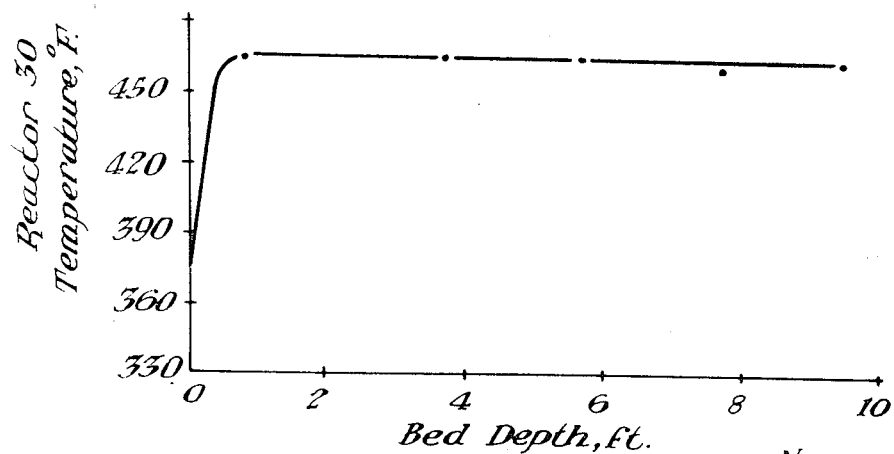

If the reaction is to be terminated prior to completion a shorter catalyst bed must be utilized in the second reactor. As noted previously the reactions in the first and third reactors are controlletd so that the maximum bed temperatures along the length of the bed stays below 470° F., as evident from FIGS. 10 and 12. This further reduces the potential significance of benzene side reaction and decreases the percentage impurity of the cyclohexane product.

Figure 13:
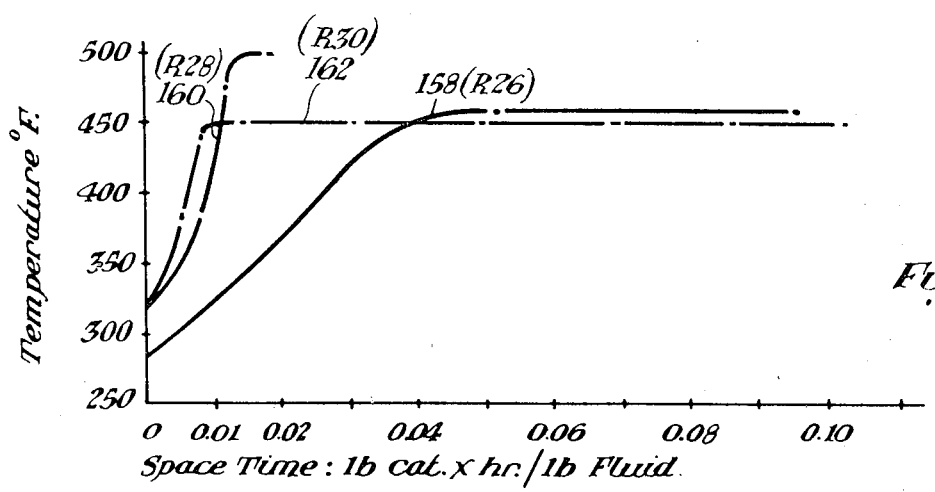
FIG. 13 is a graphical representation of space-time temperature relationships in a multiple reactor system.

FIG. 13 further illustrates the reactivity rates of the several reactors as evident from the temperature versus space-time curves 158, 160, 162 for the reactors 26–30 respectively. From the groups 158–162 it will be apparent that the reactions in the first and third vessels can be driven to completion at temperatures above the respective dew points but below the temperature at which the catalyst begins to deteriorate. On the other hand as evident from the curves 160 the temperature of the second reactor 28 rises rapidly and is held to a maximum temperature of about 500° F. through benzene rate control and a short reaction time, and through control of the maximum temperatures of the first and last reactors 26, 30. In this example, essentially all the benzene fed to the second reactor was converted.

Figure 4:
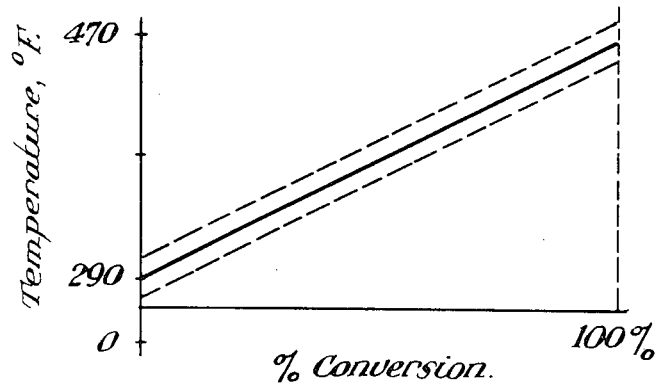
FIG. 4 is a graph showing temperature conditions in one reactor of the reactor system utilized in the FIG. 3 arrangement.

FIGS. 4, 5 and 6 are of interest in this connection in that they show respectively the variation in temperature with percentage of total conversion of the benzene feed. FIG. 5 in particular demonstrates the desirability of terminating the reaction in the second reactor 28 in advance of complete conversion of the benzene. Thus, if the reaction in reactor 28 were permitted to go to completion, the broken line portion 164 of curve 166 indicates that the reactor temperature would be considerably in excess of 500° F. or at a level sufficient to permanently deactivate the catalyst. As noted previously subjecting the catalyst to temperatures in the neighborhood of 550° F. for several hours is sufficient to irreversibly deactivate the catalyst by a factor of one-half of its original activity. Of course, the reaction in the second reactor could go to completion if the final temperature were below 500° F. at complete conversion. This could be accomplished for example through a reduction in the benzene feed rate.

Figure 1:
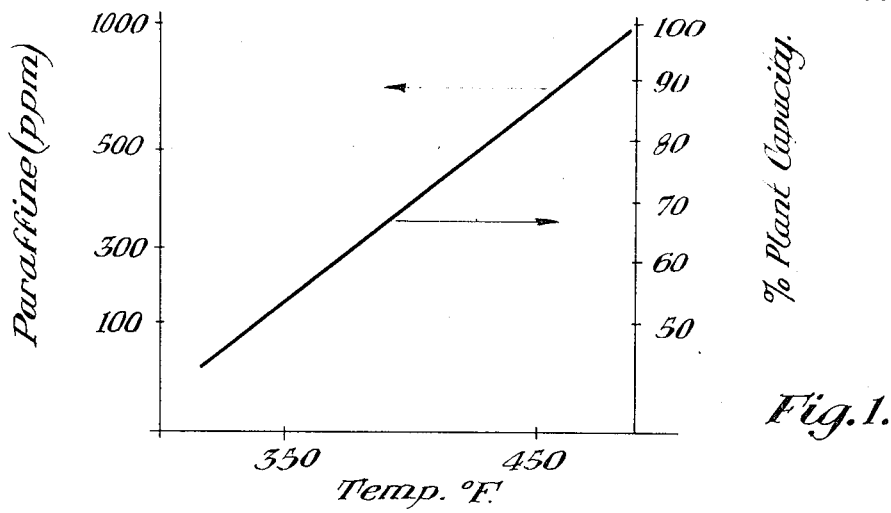
FIG. 1 is a graphical representation of the variation in plant capacity and total paraffinic impurity with operating temperature.
Figure 2:
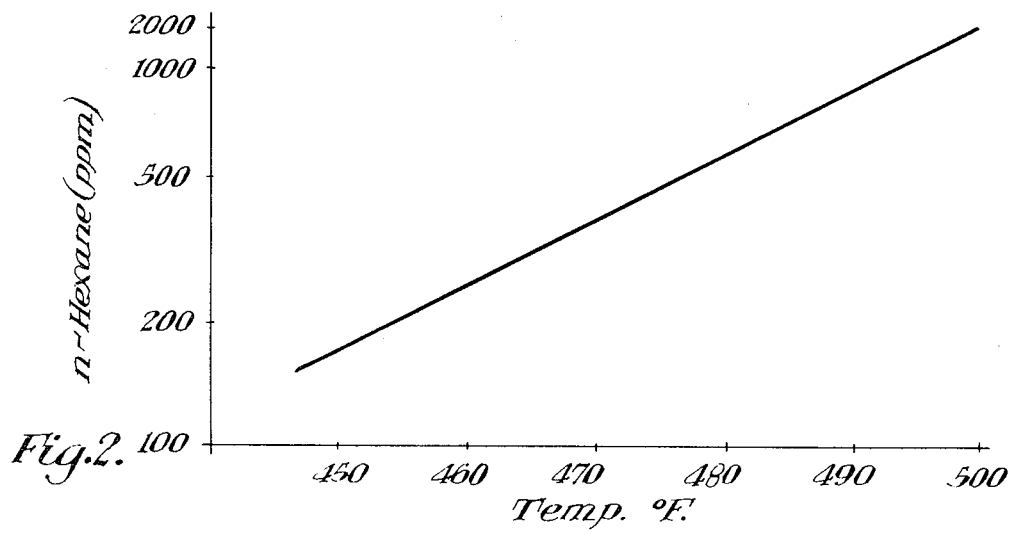
FIG. 2 is a graphical representation of variation in n-hexane impurity complement vs. operating temperature.

In the event of occurrence at dew point conditions in any of the three reactors the feed streams thereto can be eliminated by closing valves 54 and 192 as required or by shutting down the plant entirely with closure of benzene feed valve 208, as described below. However, because the operating characteristics are more critical in the second recators 28, we contemplate by-passing a portion of the second reactor feed stream (conduit 84) through bypass 84a (FIG. 1). This is made possible by the larger catalytic bed 36 which is capable of a certain amount of overloading as evident from curves 152, 156 of FIG. 9. The purity of the cyclohexane product is not substantially impaired, and, of course, the purity tolerance for a given application will effect the amount of second reactor feed which can be by-passed in this manner. The flow of by-passed feed through the conduit 84a is controlled by suitable adjustment of valves 168. As an operating example, a sufficient quantity of benzene feed and attendant vapors and gases can be by-passed directly to the third reactor 30, when the temperature in the second reactor rises above the design point or when additional production is desired. The by-pass conduit 84a therefore provides auxiliary means for controlling the production in the second reactor to maintain the aforesaid maximum temperature of 500° F.

For exemplary operating modes of the cyclohexane plant 20, the design and minimum inlet temperatures together with the design and maximum outlet temperatures of the several reactors are given in the following table:

TABLE I.—CYCLOHEXANE REACTOR TEMPERATURE INFORMATION AND OPERATION GUIDES

|  | 50% design flow | | | | |
| --- | --- | --- | --- | --- | --- |
|  | Inlet values, ° F. | | Outlet values, ° F. | | Adiabatic temperature rise, ° F. |
|  | Design | Limit. min. | Design | Limit. max. | |
| Reactor 26 | 290 | 250 | 450 | 460 | 160 |
| Reactor 28 | 350 | 290 | 500 | 500 | 150 |
| Reactor 30 | 350 | 290 | 395 | 460 | 45 |
|  | 100% design flow | | | | |
| Reactor 26 | 290 | 290 | 460 | 460 | 170 |
| Reactor 28 | 320 | 310 | 500 | 500 | 180 |
| Reactor 30 | 320 | 310 | 450 | 460 | 100 |

In one exemplary operating mode, as represented by the first portion of the table denoted "50% Design Flow," the benzene feed is divided equally between reactors 26 and 28, while in the 100% design flow mode, about 35% of the benzene feed is supplied to the first reactor 26, as set forth in the following table:

TABLE II.—FEED RATES AND FLOW DISTRIBUTION FOR CYCLOHEXANE REACTORS

|  | Units, lb./hr. | |
| --- | --- | --- |
|  | 50% design flow | 100% design flow |
| Benzene to R26 | 7,150 | 9,915 |
| Benzene to R28 | 7,150 | *18,600 |
| Proportion of benzene to R26 | 0.5 | 0.35 |
| Total benzene feed | 14,300 | 28,515 |
| Recycle CH to R26 inlet | 12,600 | 29,990 |
| Recycle CH to R26 outlet | 6,200 | 21,700 |
| Total recycle CH | 18,800 | 51,600 |
| Make-up gas | 1,710 | 3,425 |
| Recycle gas | 28,500 | 28,500 |
| Total flow |  | 112,025 |

*As much as one-half of this benzene can be fed directly to the third reactor 30, when the conversion in the second reactor 28 cannot be reduced to about 70%.

In actual tests the cyclohexane product was found unexpectedly to meet a purity of greater than 99.9 percent, with another feature of following trace impurities:

benzene <20 p.p.m.
paraffins about 500 p.p.m.
methylcyclohexane, etc. <100 p.p.m.

Of the paraffinic complement, the major portion is n-hexane, which, when removed in accordance with our invention, results in a final paraffinic impurity of less than 100 p.p.m.

Referring again to FIG. 3, the inlet feed temperature to the first reactor 26 is controlled to about 290° F. in this example by sensor 170 in its inlet port 74 which in turn controls by-pass valve 172 through conventional instrumentation to adjust a by-passing flow of the hot effluent from the second reactor 28 around the regenerative heat exchanger 68. After the regenerative heat exchanger 68 the recombined second reactor effluent normally is about 320° F. in the illustrated operation. This is further and variably reduced to about 300° F. at the third reactor inlet 90 by temperature sensor 174 which controls the adjustable pitch of fan 176 forming part of the conventional, intermediate cooler 88. Adjustment in the fan pitch is effected through conventional, interconnecting instrumentation (not shown except schematically at 177).

Similarly the valves 179 associated with the first reactor quench system 42–46 are controlled through conventional instrumentation denoted at 181 by sensor 178 in the inlet 86 of the second reactor 28 to effect a desired inlet temperature of about 300° F.

The ratio of liquid recycle cyclohexane (conduit 57a) to benzene feed in the quench liquid (conduit 76) is controlled by temperature sensor 180 and flow control valve 182 in the liquid cyclohexane recycle conduit 57a, which are likewise coupled through conventional instrumentation denoted at 183. This arrangement of course controls the benzene/cyclohexane ratio in the feed to the second reactor 28. The benzene/liquid cyclohexane ratio in the feed to the first reactor is controlled by flow controllers 184, 186, orifices 188, 190 and valves 192, 194. The operation of the last-mentioned components is proportioned by a conventional ratio controller 196.

Desirably, the ratio controlled 196 is in turn reset by the outlet temperature of the first reactor 26 to modify the benzene to liquid cyclohexane ratio of the reactants supplied thereto. One arrangement for doing this includes the use of temperature sensor 197 adjacent the outlet of the catalyst bed 32 which is coupled to the ratio controller 196 through suitable and known instrumentation denoted generally at 199. Thus, if the temperature adjacent the exit of the catalyst bed 32 tends to rise above about 460° F. the proportion of benzene in the reactor feed (conduit 56) the reduced to maintain a maximum temperature of 460° F.

Similarly controlled valving denoted generally by valves 198, 200 can be utilized to control the ratio of make-up hydrogen (conduit 62) and recycle gas (conduit 60) and to control the ratio of the gaseous feed component (conduit 66) to the aforedescribed liquid feed components by regulation of valve 202.

Our invention therefore provides interdependent control of benzene/liquid cyclohexane ratios, inlet temperatures and outlet temperatures of each reactor, and individual and summed space-time parameters, together with the ratio of liquids and gases in the feed stream of each reactor. The lower temperatures of the several indicated temperature ranges for the reactor section 22 are thus controlled to eliminate any possible occurrence of dew point temperatures. The higher temperatures of these ranges are controlled below the indicated maximum temperatures (Table I) to provide an adiabatic temperature rise of about 200° F. or less to permit an orderly progression of the highly exothermic reactions, but to prevent undue deactivation of the catalyst. This is accomplished by controlling the ratios of the liquid and gaseous cyclohexane diluents which are recycled to the several reactors. Pure benzene of course cannot be hydrogenated in the absence of such diluents as a temperature rise in the order of 1000° F. would then be anticipated.

To attain a compromise solution to the problems imposed by dew points, catalyst deactivation, acceleration of side reactions, and the resultant narrow range of available operating temperatures, temperature and material control must be consistently interdependent. An exemplary arrangement for thus effecting coupled heat and material balance has been set forth with reference to FIG. 3. The principles of the invention can be applied with facility to similar and other petrochemical reactions wherein it is necessary to steer a cautious course between maximum and minimum temperature limits, particulary when highly exothermic reactions are involved.

As noted previously the dew point temperatures of the reactor section 22 can be continuously analyzed by a dew point computer containing conventional elements. It is apparent of course that many features enter into the computation of the dew point, such that the operating personnel do not have the time available for such computations. Moreover, it is exceedingly difficult to determine the specific location or locations within the reactor section where the dew points may be dangerously approached, owing to the dynamic nature of the system, and the attendant, very rapid movement of perturbations throughout the reactor system.

Hence, the various data revealed by conventional instrumentation (not shown) and relating to inlet and outlet temperatures, volumetric flow rates, space-time values, benzene/diluent liquid ratios and liquid/gas ratios can be fed into the computer for continuous calculations of the dew points. The actual temperatures at a variety of locations within the system can then be compared with computer readout. By observing these comparisons the operator can, if necessary, over-ride the various automatic controls illustrated in FIG. 3 either to shut down or to continue the operation or to adjust material balances at selected points within the reactor section. Alternatively, computer readout can be differentiated automatically wtih actual temperature and flow readings to shut down the process, or reduce various feed flows to the recators, or otherwise modify it through the aforementioned overriding controls.

The principles of our invention can be applied to similar catalytic processes where a totally gaseous phase system must be operated near its dew point to control an exothermic reaction. The invention is particularly adaptable to those catalytic operations wherein the effectiveness factor of the catalyst is low (less than about 0.9) and wherein the reaction rates are further reduced (or quenched) by the presence of liquid in the catalyst pores, rather than the normal vapor. By ensuring a single phase or all gaseous system a uniform diffusivity rate is attained which would otherwise be disrupted if a liquid slug is permitted to engage the catalyst. The invention also is amenable to those operations which are highly exothermic and wherein the reactants must be diluted in carefully controlled ratios of reactants/diluent to control the temperature rise across the reactor.

For greater productivity of the cyclohexane plant 20, a portion of an increased benzene feed can be diverted through conduit 204 directly to the third reactor 30 via conduit 70, regenerative heat exchanger 68 or bypass 172, and the intermediate cooler 88. Alternatively the direct benzene conduit 204 can be utilized to divert a portion of the normal benzene feed from the first or second reactor 26 or 28, or both, as an additional means for controlling the reaction therein. As noted previously the third reactor with its considerably larger catalyst bed 36 is designed to handle an additional output in the event that the second reactor 28 is partially bypassed (conduit 84a). Most importantly, the third reactor is larger to reduce the benzene content to a very low level, i.e. a p.p.m. level. Long space times are needed to do this. The direct flow of benzene to the third reactor 30 can be controlled by valve 206 which in turn can be automatically set by suitable means (not shown) sensitive for example to a given temperature above the control temperature of the first or second reactor outlets or both.

We also contemperate means for terminating benzene fed to the reactor section 22, for example by closing stop valve 208 in benzene feed line 48. Desirably the benzene feed is terminated automatically upon the occurrence of abnormal conditions within the reactor system 22, by means, for example, of a temperature sensor 210 or 212 in the outlet of the reactor 26 or 28. In the illustrated arrangement the sensor 210 or 212 is designed to close the benzene feed valve 208 through suitable known circuitry denoted generally at 211 and 213 whenever a maximum temperature of 550° F. occurs in either reactor. A similar sensor 214 can be utilized in the outlet of the third reactor 30 but would not be necessary in most applications, as thorough control of the first two reactors 26, 28 usually exercises a high degree of control over the final reactor 30.

It is also desirable to terminate the benzene feed in the event that the proportion of hydrogen in the recycle gas stream (conduit 60) falls below a predetermined level, for example about 50 percent in the illustrated system. For this purpose a conventional hydrogen analyzer 216 is coupled to the conduit 60 and suitable and known instrumentation denoted generally by dashed line 218 is arranged to close the benzene feed valve 208 when the hydrogen concentration falls below the predetermined level. Similarly it is desirable to terminate the bnezene feed if the make-up hydrogen supply (conduit 62) is terminated for a predetermined interval, for example about five minutes in the illustrated plant. This is accomplished by a suitable sensor 220 in conduit 62 and timer 222 which is coupled through suitable and known instrumentation 223 to the benzene valve 208. The conversion reactions in any of the reactors 26-30 are also deleteriously affected by an insufficient total flow of recycle gas and make-up hydrogen (conduit 66). Therefore, it is additionally desirable to terminate benzene feed in the event that the flow of gas through conduit 66 reaches a predetermined low value. This is accomplished by use of a flow measuring device for example orifice 224 and conventional flow meter 226 coupled through suitable instrumentation 228 to the benzene feed valve 208.

In the operation of the aforedescribed reactor system, when using space-time parameters greater than a summation of 0.4 together with the parameters as set forth in Table I of the aforementioned copending application, the iso-hexane impurity in the resultant cyclohexane product has been found to exceed 100 p.p.m. Therefore, if it is desired to produce an ultrapure cyclohexane product, having a total paraffinic impurity of less than 100 p.p.m., it follows that simply removing the hexane impurity complement, for example with the aforementioned molecular sieves, would be of no avail, as the remaining i-$C_6$ would exceed the minimum impurity specification. In accordance with our present invention, the initial approach to alleviating this problem is to substitute such operating parameters as will minimize the iso-hexane impurity complement (along with other non-removable paraffinic impurities) to an originally present amount of less than 100 p.p.m. or other minimum impurity specification.

It is an unexpected feature of this invention and one of the surprising results thereof that we are enabled to accomplish this desirable end by modifying the operating temperature parameters of the cyclohexane plant of the aforesaid copending application. The extent of modification is surprisingly slight, as a comparison of Table I hereof with Table I of the aforesaid copending application will show. By imposing these temperature limits on reactors 26, 28, 30, we are enabled to obtain a total non-removable paraffinic impurity of less than 100 p.p.m., although the total paraffinic impurity (including the preponderant amount of removable n-hexane) is initially greater than the ultra-purity specification. In conjunction with usage of modified reactor operating temperatures, we also control the space time conditions in the first and third reactors 26, 30 such that the summation of the space times in these reactors is less than 0.4 and preferably 0.2 or less.

A number of surprising and unexpected results are immediately apparent. In the first instance, the yield of the cyclohexane plant is not materially affected; (2) the intermediate reactor 28 need not be separately controlled either as to temperature or space-time; (3) apparently owing to its shorter bed length and character of its temperature gradient, the intermediate reactor 28 can operate at a temperature significantly greater than the outlet temperature of either the first reactor 26 or the final reactor 30 without measurably increasing the iso-hexane impurity complement; (4) the benzene impurity in the final product is reduced from less than 100 p.p.m to less than 20 p.p.m., apparently as a result of the somewhat higher design temperature at the reactor 30 outlet; and (5) the non-removable paraffinic impurity complement is reduced to less than 100 p.p.m. in the final cyclohexane product, with the result that the aforementioned minimum paraffinic specification can be met when the cyclohexane product is further treated as described below.

By imposing a maximum temperature limit of 460° F. the design outlet temperature of the reactor 26 is lowered only 5° F. No danger of approaching dew point conditions anywhere within the reactor 26 is evident. As further assurance, the minimum temperature of the first reactor is raised 10° to 290°, in comparison with the aforementioned copending application. The feed benzene-recycle cyclohexane ratio can be adjusted slightly to achieve the aforementioned minimum and maximum temperatures within the reactor 26 in the manner outlined previously. Referring again to Table I hereof, the maximum temperature of the third reactor 30 is reduced to 450° F. while the design outlet temperature is raised to the same temperature or 450° F.

Figure 14:
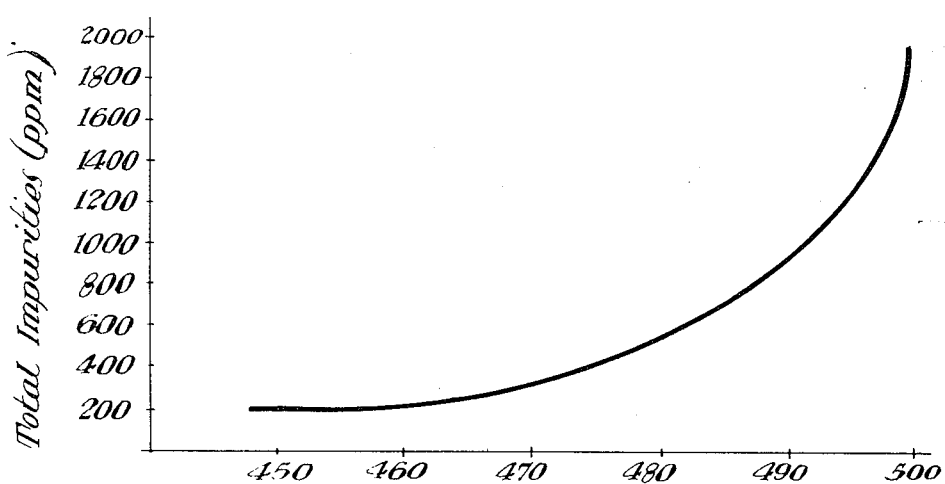
FIG. 14 is a graphical representation of the variation in total product impurities with operating temperatures.

The surprising significance of these apparently minor reductions in maximum operating temperatures is evident from an inspection of FIG. 14. As an operating temperature of 500° F. is approached, it is seen that the rate of side reactions is increasing asymptotically. FIG. 14 also demonstrates the advantage of operation with a maximum reactor temperature in the range of about 450° F. to 470° F. As mentioned previously, by maintaining the maximum reactor temperature at 470° or below in reactors 26 and 30, the abbreviated reactor 28 will not exhibit a maximum temperature in excess of 500° F., which may then be considered its design temperature. Also, as noted previously, the short residence time of the reactants within the reactor 28 causes at most a negligible production of impurities of the paraffinic variety, as these are space time dependent. Moreover, owing to the abbreviated length of the bed 34 in the intermediate reactor 28, very little of the intermediate reactor bed 34 "sees" a maximum temperature of 500° F. as evident from curve 160 of FIG. 13. Because of the abbreviated length of the intermediate reactor 28, the temperature of the reactants is increasing fairly rapidly at the exit of the catalyst bed 34, whereat the reaction, of course, terminates insofar as the reactor 28 is involved.

On the other hand. FIGS. 10–13 reveal the unexpected importance of space-time values in the first and third reactors 26, 30. In the first reactor 26, a substantial proportion of the catalyst bed (i.e. about 60 percent) "sees" the maximum reactor temperature of 460° F. Thus, the space-time parameter of the reactor bed 32 becomes quite important, as the total amount of paraffinic impurities are linearly dependent upon the space-time value. The space-time parameter becomes even more significant in the third reactor bed 36 (FIG. 12) as about 90 percent of the reactor bed is subjected to maximum temperature of 450° F. The variations of reactor temperatures with space-time values in the first and third reactors 26, 30 are set forth by curves 158, 162, respectively, in FIG. 13 of the drawings.

Quite surprisingly, we have discovered that the total initial production of paraffinic impurities can be kept within the bounds imposed by ultra-purity requirements by maintaining a parameter equivalent to the summation of the space-time values of the first and third reactors below 0.4 and preferably at 0.2 or less. In particular, we prefer to maintain the space-time values of each reactor 26 or 30 at 0.1 or less, although it is within the contemplation of our invention that the coefficient of one of the reactors 26, 30 can be increased and the other decreased within the aforementioned range of values, depending upon a specific configuration of the related petrochemical plant and its multiple reactor system. As also noted from FIG. 13, the space-time value of the intermediate reactor 28 is negligible and thus, depending again upon a specific application of the invention, it is contemplated that the summation of the space-times of all of the reactors 26–30 should be within the aforesaid range.

The space-time values can be controlled within the aforementioned ranges, by adjusting the individual bed lengths of the reactors 26–30, by adjusting catalyst weight, by modifying the volumetric flow rates of the reactants, or by a combination of two or more of these. Changes in volumetric flow rates can be effectuated by modifying the feed benzene rates or by modifying the amount of recycle cyclohexane or both, as explained in the description of the plant layout of FIG. 3. Such changes must be made with care, for as pointed out previously, the reaction temperature cannot be lowered appreciably without drastically reducing plant output. Moreover, a substantial reduction in operating temperature may be productive of dew-point conditions, liquid slugging, and reactor temperature runaway. The space-time parameters likewise must be manipulated cautiously; for example, shortening of the catalyst bed length tends to increase the benzene impurity in the final product.

With proper control of maximum reactor temperatures and maximum space-time values of the overall reactor system, we have found that the total, non-removable paraffinic impurity is less than the aforementioned minimum specification, e.g. less than 100 p.p.m. It must be understood, however, that almost in every case, the total paraffinic impurity initially exceeds this minimum specification by a considerable margin and may fall within the range of about 500 p.p.m. or greater with application of our invention as described thus far. Such product, however, offers a significant, unexpected, and advantageous improvement upon the prior art. By application of the aforementioned control arrangement and method, it results unexpectedly that that portion of the paraffinic impurity over and above the paraffinic ultra-purity specification of about 100 p.p.m. is removable n-hexane.

Referring again to FIG. 3, with the trace impurities and the cyclohexane product initially minimized in the manner described above, part or all of the product can be conducted to vessel or bed 250 containing a quantity of molecular sieve or zeolite material 258. That portion of the cyclohexane product destined for ultra-purity is conveyed through valved conduit 252 to the zeolite tank 250 and thence to storage tank 254. In the tank 250 the cyclohexane product is percolated through the molecular sieves or synthetic zeolite 258 preferably of the 4A and/ or 5A varieties for removal of substantially all of the paraffin impurity. As virtually all of the n-hexane is removed, the residual paraffins account for less than 100 p.p.m. of trace impurities.

In tests run with our novel plant arrangement and operational method, we have obtained an ultra-pure cyclohexane product (as delivered to the storage tank 254) having less than 20 p.p.m. benzene, less than 100 p.p.m. paraffins, and less than 100 p.p.m. of other trace impurities. The characteristics of a typical paraffin removal operation are tabulated as follows (using 5A molecular sieves):

TABLE III

| Impurity (p.p.m.) | Spec. | Product Bed 250 inlet | Product Bed 250 outlet |
|---|---|---|---|
| Benzene | | <20 | <20 |
| n-C⁶ | | 400 | 0 |
| n-C⁷ | | 10 | 0 |
| i-C⁶ | | 75 | 72 |
| Methylcyclohexane | | <100 | <100 |
| Total aliphatic hydrocarbons | ¹100 | 485 | 72 |

¹ Maximum.

Thus, even without the zeolite afterbed 250, we are enabled to obtain an ultra-pure cyclohexane product of about 99.94 percent pure. With the zeolite afterbed 250, the purity of our cyclohexane product can be increased to about 99.98% again considering the inevitable unreacted benzene, methylcyclohexane, etc. impurities. This contrasts favorably with the 99.9 percent purity available by virtue of the plant arrangement and operating method disclosed in the aforementioned copending application. In the event that cyclohexane of a higher purity level is not desired or required, the zeolite treatment can be eliminated by supplying the entire output of the stabilizer tower 106 through valved conduit 111 to cooler 113 and storage tank 115.

From the foregoing, it will be apparent that novel and efficient arrangements for the Control of Trace Impurities in Petrochemical Processes have been described herein. While we have shown and described certain presently preferred embodiments of the invention and have illustrated presently preferred methods of practicing the same, it is to be distinctly understood that the invention is not limited thereto but may be otherwise variously embodied and practiced within the spirit and scope of the invention.

We claim:

1. A method for controlling a cyclohexane plant to increase the purity of the cyclohexane product and to minimize aliphatic side reactions, such as formation of n-hexane, said plant having a plurality of hydrogenation reactors and a catalyst bed in each of said reactors, said method comprising the steps of supplying benzene and hydrogen reactants to each of said reactors, controlling the inlet and outlet temperatures of a first and last of said reactors to maintain the temperature in all of said reactors within a predetermined range, maintaining the minimum inlet temperatures of said reactors above about 290° F. and the maximum outlet temperatures of said first and last reactors below about 470° F., recycling a portion of said product for diluent purposes, and maintaining the sum of the space-time values of at least said first and said last reactors below about 0.4 pound of catalyst times hours per pound of total fluid.

2. The method according to claim 1 including the modified step of maintaining the space-time summation at 0.2 or less.

3. The method according to claim 1 wherein said catalyst is nickel on kieselguhr, said method including the additional step of percolating at least a portion of the output of said last reactor through a bed of molecular sieve material.

4. The method according to claim 3 including the modified step of percolating said output portion through at least one of 4A and 5A molecular sieves.

5. The method according to claim 1 including the modified step of controlling the outlet temperatures of said first and said last reactors such that the maximum outlet temperature of an intermediate reactor does not exceed 500° F.

6. The method according to claim 2 including the further modified step of maintaining a space-time parameter in each of said first and said second reactors at 0.1 or less.

7. The method according to claim 1, wherein side reactions productive of paraffins are minimized, including the additional step of removing substantially all of the n-paraffins by passage through a molecular sieve zone.

8. A method for controlling a cyclohexane plant to increase the purity of the cyclohexane plant and to minimize aliphatic side reactions such as the formation of n-hexane, said plant having conversion reactor means and a catalyst bed means therein, said method comprising the steps of supplying benzene and hydrogen reactants to said reactor means, controlling inlet and outlet temperatures of said reactor means to maintain the temperature at any point within said reactor means within a predetermined range, recycling a portion of said product for diluent purposes, maintaining the maximum outlet temperature of said reactor means below about 470° F. maintaining a minimum inlet temperature of said reactor means sufficiently above the dew points of said reactants such that said reactants and said recycle portion exist solely in their vapor phases in every part of said reactor means at a temperature below said maximum temperature, and maintaining spacetime parameters in said reactor means below about 0.4 pound of catalyst times hours per pound of total fluid.

9. The combination according to claim 8, wherein said reactor means include a plurality of reactors each having a bed of catalyst material therein, including the additional step of proportioning the sizes of said catalyst beds relative to differing reactivity rates in said reactors respectively.

10. The combination according to claim 8 wherein said reactor means include at least three reactors including the additional step of maintaining the summation of space-time parameters in the first and last reactors of said reactor means below about 0.4 pound of catalyst times hours per pound of total fluid.

11. The combination according to claim 10 wherein said space-time maintaining step is modified to maintain said summation at 0.2 or less.

References Cited
UNITED STATES PATENTS

| | | | |
|---|---|---|---|
| 3,427,361 | 2/1969 | Arnold | 260—666 P |
| 3,450,783 | 6/1969 | Merryfield et al. | 260—667 |
| 3,529,033 | 9/1970 | Frilette et al. | 260—667 |
| 3,428,697 | 2/1969 | Zulueta | 260—667 |

DANIEL E. GANTZ, Primary Examiner

V. O'KEEFE, Assistant Examiner

U.S. Cl. X.R.

260—683.9